(12) United States Patent
Herden et al.

(10) Patent No.: US 6,925,983 B2
(45) Date of Patent: Aug. 9, 2005

(54) FUEL INJECTION VALVE SPARK PLUG COMBINATION

(75) Inventors: Werner Herden, Gerlingen (DE); Dieter Volz, Heilbronn (DE); Gernot Wuerfel, Vaihingen/Enz (DE); Anja Melsheimer, Stuttgart (DE); Simon Schmittinger, Renningen (DE); Rainer Norgauer, Ludwigsburg (DE); Rene Deponte, Weil Im Schoenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,215

(22) PCT Filed: Sep. 20, 2002

(86) PCT No.: PCT/DE02/03552
§ 371 (c)(1),
(2), (4) Date: Dec. 16, 2003

(87) PCT Pub. No.: WO03/050410
PCT Pub. Date: Jun. 19, 2003

(65) Prior Publication Data
US 2004/0084011 A1 May 6, 2004

(30) Foreign Application Priority Data
Dec. 6, 2001 (DE) .......................................... 101 59 910

(51) Int. Cl.[7] .............................................. F02M 57/06
(52) U.S. Cl. ..................................................... 123/297
(58) Field of Search ................................ 123/297, 295, 123/266, 267

(56) References Cited

U.S. PATENT DOCUMENTS

| 3,507,262 | A | | 4/1970 | Stage |
| 4,006,725 | A | | 2/1977 | Baczek et al. |
| 4,864,989 | A | | 9/1989 | Markley |
| 5,609,130 | A | | 3/1997 | Neumann |
| 5,611,307 | A | | 3/1997 | Watson |
| 5,927,244 | A | * | 7/1999 | Yamauchi et al. .......... 123/295 |
| 6,138,637 | A | * | 10/2000 | Bubeck ...................... 123/295 |

FOREIGN PATENT DOCUMENTS

| DE | 1 576 030 | 11/1971 |
| DE | 196 38 024 | 3/1998 |
| DE | 695 21 204 | 6/2002 |
| EP | 0 654 602 | 5/1995 |
| EP | 0 661 446 | 7/1995 |
| GB | 637 584 | 5/1950 |
| JP | 05 288136 | 11/1993 |
| JP | 6-123270 | 5/1994 |

* cited by examiner

Primary Examiner—Mahmoud Gimie
(74) Attorney, Agent, or Firm—Kenyon & Kenyon

(57) ABSTRACT

A fuel injector-spark plug combination includes a fuel injector for the direct injection of fuel into a combustion chamber of an internal combustion engine and a spark plug with a spark-plug insulator, the spark plug having a first electrode, and a second electrode for igniting the fuel injected into the combustion chamber. The fuel injector and the spark-plug insulator of the spark plug are arranged at a biaxial offset in a respective receiving bore of a shared connecting member inserted in a recess of a cylinder head.

12 Claims, 3 Drawing Sheets

FUEL INJECTION VALVE SPARK PLUG COMBINATION

FIELD OF THE INVENTION

The present invention is based on a fuel injector-spark plug combination.

BACKGROUND INFORMATION

From the European Published Patent Application No. 0 661 446, a fuel injector having an integrated spark plug is known. The fuel injector with integrated spark plug is used for the direct injection of fuel into the combustion chamber of an internal combustion engine and for igniting the fuel injected into the combustion chamber. Due to the compact integration of a fuel injector with a spark plug it is possible to save installation space at the cylinder head of the internal combustion engine. The known fuel injector with integrated spark plug has a valve body which, together with a valve-closure member actuable by means of a valve needle, forms a sealing seat, adjacent to which is a spray-discharge orifice, which discharges at an end face of the valve member facing the combustion chamber. A ceramic insulation element insulates the valve body from a housing body in a high-voltage proof manner, the housing body being able to be screwed into the cylinder head of the internal combustion engine. Located on the housing body is a ground electrode in order to form an opposite potential to the valve member acted upon by high voltage. In response to a sufficient high potential being applied to the valve member, a spark arc-over takes place between the valve body and the ground electrode connected to the housing body.

However, a disadvantage of the known fuel injector with integrated spark plug is that the position of the spark arc-over is not defined with respect to the fuel jet spray-discharged from the discharge orifice, since the spark arc-over may occur just about anywhere in the lateral region of a projection of the valve body. A reliable ignition of the so-called jet root of the fuel jet spray-discharged from the spray-discharge orifice is not possible with the required reliability in this known design. However, a reliable and temporally precisely defined ignition of the fuel jet is absolutely required in order to achieve reduced emissions. Furthermore, the discharge orifice of the fuel jet may be subject to steadily worsening carbon fouling or coking, which influences the form of the spray-discharged jet.

SUMMARY OF THE INVENTION

In contrast, the fuel injector-spark plug combination of the present invention, having the characterizing features of the main claim, has the advantage over the related art that by a biaxial arrangement of the fuel injector and the spark-plug insulator of the spark plug in a shared connecting member, which is insertable in the cylinder head of the internal combustion engine, the components are optimally arranged with respect to each other, resulting in a system which is easy to install and requires little space.

The features set forth in the dependent claims make possible advantageous developments of and improvements to the fuel injector-spark plug combination described in the main claim.

In an advantageous manner, the spark-plug insulator is secured in its receiving bore by a threaded sleeve or a clamping ring. The spark-plug insulator is screwed into, or inserted in, the respective mounting support.

Particularly advantageous is the tilting of the longitudinal axis of the spark-plug insulator relative to the longitudinal axis of the fuel injector, since it avoids that the spark plug is directly exposed to the fuel jet of the fuel injector.

Furthermore, it is advantageous that, by a suitable form of the connecting member, the fuel injector is able to be held in place inside it, for instance by means of a mounting clamp, which rests on a shoulder of the fuel injector.

In an advantageous manner, the mounting clamp may be integrally formed with the connecting member.

It is also advantageous that both the fuel injector and the individual parts of the spark plug, i.e., the spark-plug insulator and the ground electrode, are able to be exchanged independently of one another, without having to remove the connecting member from the cylinder head or having to remove one of the other components.

DETAILED DESCRIPTION

Figure 1:
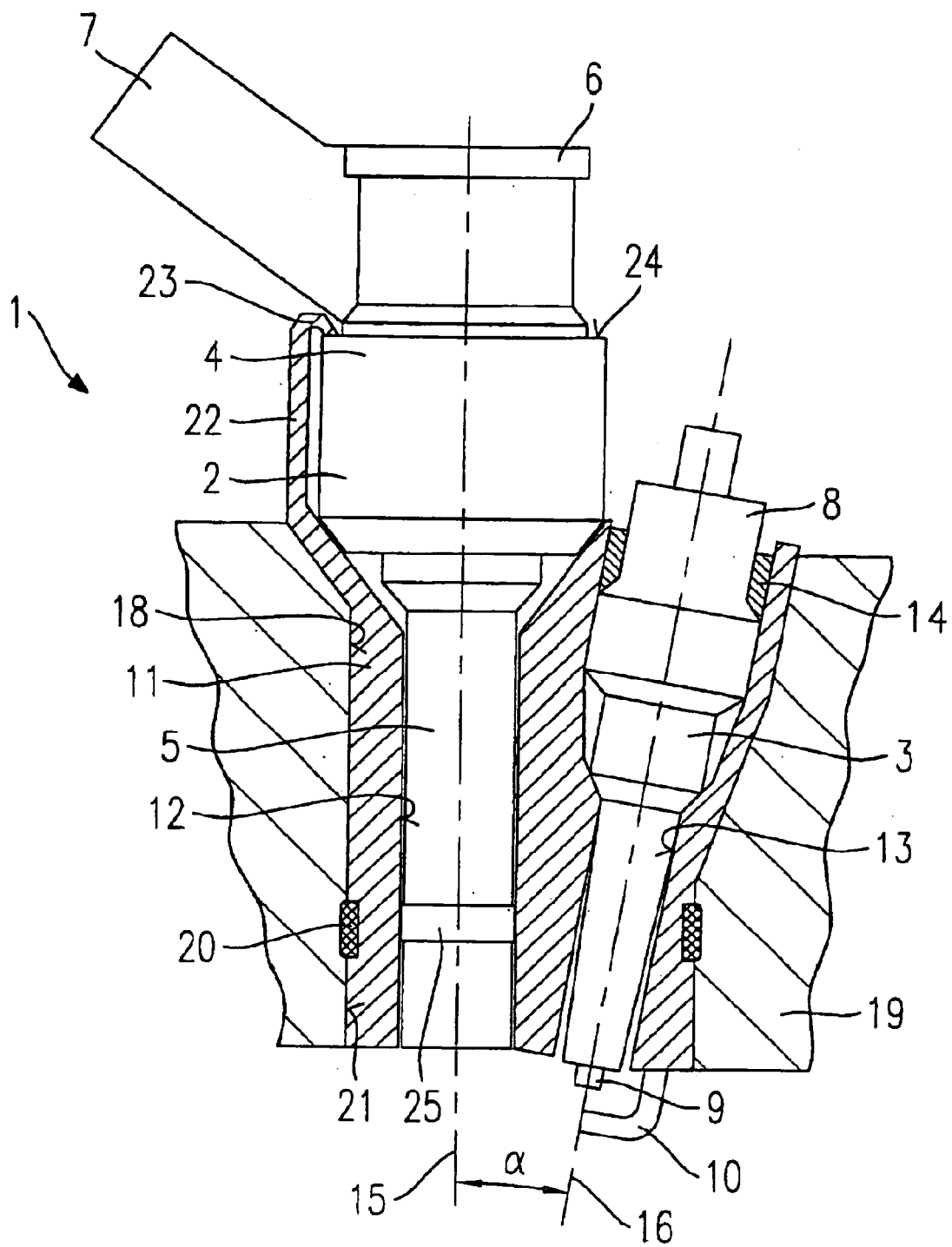
FIG. 1 shows a schematic section through a first exemplary embodiment of a fuel injector-spark plug combination, configured according to the present invention.

FIG. 1 shows a fuel injector-spark plug combination 1 having a fuel injector 2 for the direct injection of fuel into a combustion chamber of a mixture-compressing internal combustion engine having external ignition and a spark plug 3 for igniting the fuel spray-discharged into the combustion chamber according to a first exemplary embodiment of the present invention.

Fuel injector 2 has a housing body 4 and a nozzle body 5. Fuel is conveyed to fuel injector 2 via an inflow nipple 6, which is connected to a fuel-distributor line (not shown further in FIG. 1). Fuel injector 2 has an electric plug-in contact 7 which allows the contacting of the actuation device of fuel injector 2 which is not shown in FIG. 1.

Spark plug 3 has a conventional design and is made up of a spark-plug insulator 8, which is preferably made of a ceramic material, and a first electrode 9 positioned therein. First electrode 9 is electrically contactable by an ignition device (not shown further). At least one second electrode 10 is formed on a connecting member 11, which accommodates fuel injector 2 and spark plug 3 according to the present invention.

Connecting member 11 is designed such that it forms a one-piece connecting member both for fuel injector 2 and for spark-plug insulator 8 of spark plug 3. It has a first receiving bore 12 for fuel injector 2 and a second receiving bore 13 for spark-plug insulator 8 of spark plug 3. Spark-plug insulator 8 of spark plug 3 and fuel injector 2 are able to be connected in connecting member 11 in a releasable manner. In the first exemplary embodiment shown in FIG. 1, spark-plug insulator 8 is screwed into a threaded sleeve 14, which is joined to connecting member 11 with positive engagement. Receiving bores 12 and 13 for fuel injector 2 and spark-plug insulator 8 of spark plug 3 are biaxially arranged and preferably tilted at an arbitrary angle α formed between a longitudinal axis 15 of fuel injector 2 and a longitudinal axis 16 of spark-plug insulator 8 of spark plug 3. Second electrode 10 of spark plug 3 is preferably integrated in connecting member 11 as well.

By a suitable selection of angle α and the geometry of a sealing seat, and of at least one spray-discharge orifice of fuel injector 2 and the injection jet, respectively, an optimal ignition of the mixture cloud injected into the combustion chamber is able to be ensured, with spark plug 3 being subjected to minimal thermal shock, so that the fuel consumption and the emissions of the internal combustion engine are influenced in an advantageous manner.

The advantages of connecting member 11 configured according to the present invention compared to separate components, are the simple installation possibility in a recess 18 of a cylinder head 19 of the internal combustion engine, the possibility of a separate exchange of fuel injector 2, spark-plug insulator 8 and second electrode 10 of spark plug 3 and also the reduced installation space of spark plug 3 and fuel injector 2 in cylinder head 19.

The advantages compared to a coaxial positioning of fuel injector 2 and spark plug 3 are, in particular, the increased durability of the components and an improvement in the cold start-characteristics of the internal combustion engine, since expensive ceramic coatings will not be necessary. This also keeps the manufacturing and servicing costs low.

Recess 18 of cylinder head 19 may be embodied in the form of a bore or an elongated hole, which is filled by the correspondingly formed connecting member 11. The sealing from the combustion chamber is accomplished by a seal 20 which is situated between connecting member 11 and a wall 21 of cylinder head 19. Seal 20 may have a toroidal or annular shape, for instance, of any desired cross section and be made of a Teflon material.

Connecting member 11 is integrally formed from a suitable material and, apart from receiving bores 12 and 13 for fuel injector 2 and spark plug 3, has a mounting clamp 22 for fuel injector 2. Mounting clamp 22 extends along a side of fuel injector 2 that faces away from spark plug 3 and holds it in position inside connecting member 11 by means of a protruding edge 23 which is supported on a shoulder 24 of fuel injector 2 surrounding inflow nipple 6. A seal 25 between nozzle body 5 and connecting member 11 ensures the tightness of the system with respect to the combustion chamber.

Furthermore, threaded sleeve 14, which was already mentioned earlier, into which spark-plug insulator 8 of spark plug 3 is able to be screwed, is integrated in form-locking manner by pressing it into connecting member 11, for instance.

Figure 2A:
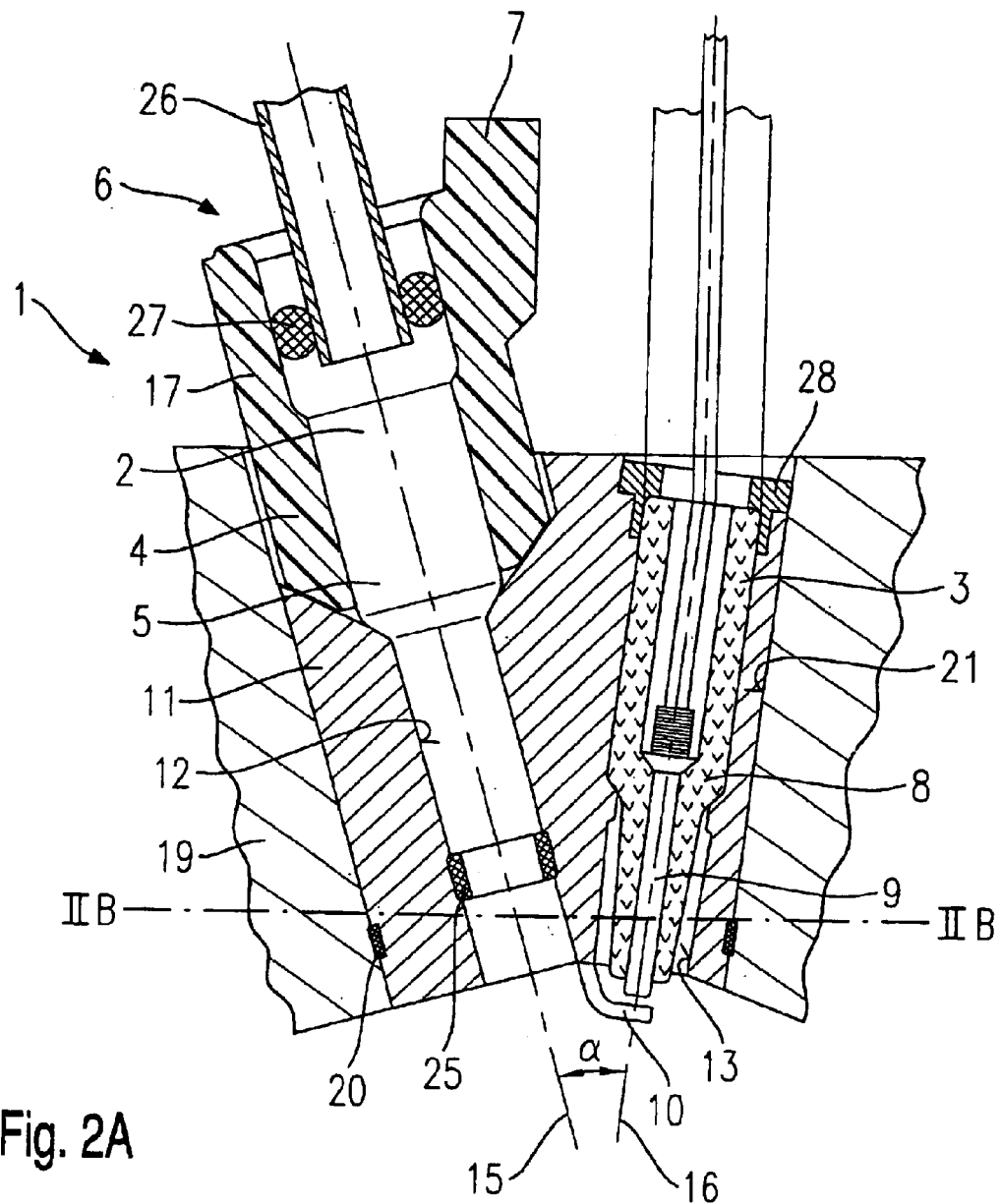
FIG. 2A shows a schematic section through a second exemplary embodiment of a fuel injector-spark plug combination, configured according to the present invention.

In the same view as FIG. 1, FIG. 2A shows a second exemplary embodiment of a fuel injector-spark plug combination 1 configured according to the present invention. Components corresponding to FIG. 1 have been provided with identical reference numerals, and those already described in FIG. 1 will not be described anew.

In order to further reduce the installation space even in the case of larger angles α between spark plug 3 and fuel injector 2, fuel injector 2 may be rotated in such a way that electrical plug-in contact 7 lies on the side of fuel injector 2 facing spark plug 3.

Connecting member 11 in the present second exemplary embodiment is no longer provided with a mounting clamp 22 for fuel injector 2. Instead, fuel injector 2 may be held in position, for instance, by the pressure exerted by a fuel-distributor line 26, which is inserted in inflow nipple 6 and sealed by a seal 27. Therefore, this exemplary embodiment of a connecting member 11 for a fuel distributor-spark plug combination 1 is especially easy to manufacture.

In the present exemplary embodiment, spark-plug insulator 8 of spark plug 3 is mounted via a clamping ring 28, which—like threaded sleeve 14 described in FIG. 1—is integrated in connecting member 11 with positive engagement.

Figure 2B:
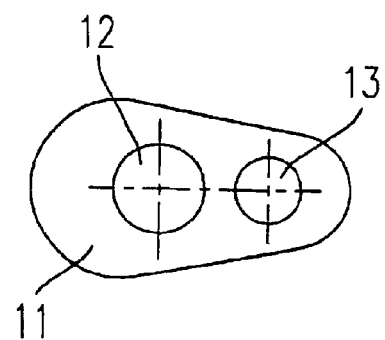
FIG. 2B shows a section through the connecting member of the fuel injector-spark plug combination, along line IIB—IIB in FIG. 2A.

In a part-sectional view, FIG. 2B shows a section through the exemplary embodiment of a fuel injector-spark plug combination 1 as shown in FIG. 2A along line IIB—IIB in FIG. 2A.

As can be seen in FIG. 2B, connecting member 11 has an asymmetrically oval shape in the longitudinal direction and a uniform material strength adapted to the thickness of fuel injector 2 and spark-plug insulator 8. In this way, connecting member 11 is strong enough to withstand the pressure prevailing in the combustion chamber of the internal combustion chamber without deforming in recess 21. The form of connecting member 11 and the corresponding form of recess 21 are freely selectable and only dependent on the desired positioning of fuel injector 2 and spark plug 3.

Figure 3:
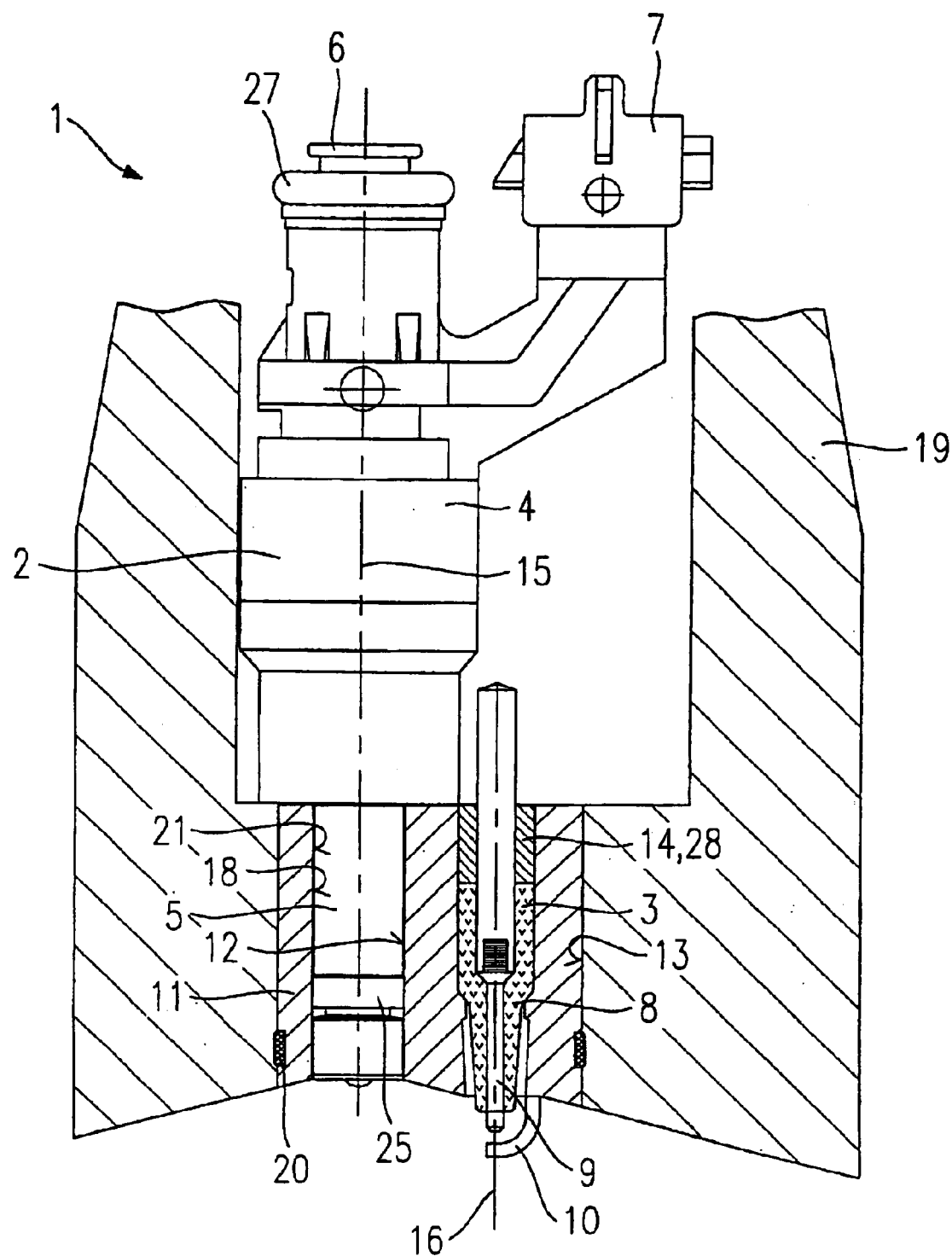
FIG. 3 shows a schematic section through a third exemplary embodiment of a fuel injector-spark plug combination, configured according to the present invention.

FIG. 3 shows a third exemplary embodiment of a fuel injector-spark plug combination 1 configured according to the present invention.

The exemplary embodiment shown in FIG. 3 differs from the exemplary embodiments shown in FIGS. 1 and 2A in that, in particular, the angle α formed between fuel injector 2 and spark plug 3 amounts to 0°, so that spark plug 3 and fuel injector 2 are installed in connecting member 11 in parallel to one another. This allows an especially small connecting member 11 and, therefore, a particularly space-saving fitting position of fuel injector-spark plug combination 1 in cylinder head 19. The formation of the mixture cloud and the spray-discharge direction towards electrodes 9 and 10 of spark plug 3 may be influenced by giving the geometry of the sealing seat and the spray-discharge orifices of fuel injector 2 an appropriate design.

The present invention is not restricted to the exemplary embodiments shown and applicable to various designs of fuel injectors and arbitrary tilting angles of spark plug 3 and fuel injector 2 with respect to one another.

What is claimed is:

1. A fuel injector-spark plug combination, comprising:
    a fuel injector for performing a direct injection of a fuel into a combustion chamber of an internal combustion engine;
    a spark plug for igniting the fuel injected into the combustion chamber, the spark plug including a spark-plug insulator, a first electrode, and a second electrode; and
    a shared connecting member, wherein:
        the fuel injector and the spark-plug insulator are arranged at a biaxial offset in a respective receiving bore of the shared connecting member,
        the shared connecting member is able to be inserted in a recess of a cylinder head of the internal combustion chamber, and
        the shared connecting member is integrally formed as a one-piece connecting member both for the fuel injector and for the spark-plug insulator of the spark plug.

2. The fuel injector-spark plug combination as recited in claim 1, further comprising:
    a seal by which the shared connecting member is sealed from the cylinder head.

3. The fuel injector-spark plug combination as recited in claim 1, wherein:

a longitudinal axis of the fuel injector is tilted at an angle relative to a longitudinal axis of the spark-plug insulator.

4. The fuel injector-spark plug combination as recited in claim 1, wherein:

a longitudinal axis of the fuel injector is parallel to a longitudinal axis of the spark-plug insulator.

5. The fuel injector-spark plug combination as recited in claim 1, wherein:

the spark-plug insulator and the fuel injector are connected to the shared connecting member in a detachable manner.

6. The fuel injector-spark plug combination as recited in claim 5, further comprising:

a mounting clamp by which the fuel injector is held in place in the shared connecting member.

7. The fuel injector-spark plug combination as recited in claim 6, wherein:

the mounting clamp is integrally formed with the shared connecting member.

8. The fuel injector-spark plug combination as recited in claim 5, further comprising:

a threaded sleeve by which the spark-plug insulator is held in place in the shared connecting member.

9. The fuel injector-spark plug combination as recited in claim 5, further comprising:

a clamping sleeve by which the spark-plug insulator is affixed on the shared connecting member.

10. The fuel injector-spark plug combination as recited in claim 1, wherein the fuel injector is configured to connect to an electrical plug-in contact on the side of the fuel injector facing the spark plug insulator.

11. The fuel injector-spark plug combination as recited in claim 10, wherein the fuel injector is configured to be held in position in the shared connecting member by pressure exerted by a fuel-distributor line.

12. The fuel injector-spark plug combination as recited in claim 10, wherein the shared connecting member has an asymmetrically oval shape along a transverse cross section in the longitudinal direction.

* * * * *